United States Patent
Alshuhail

(10) Patent No.: US 11,603,175 B2
(45) Date of Patent: Mar. 14, 2023

(54) AUTONOMOUS UNDERWATER VEHICLE TO GENERATE SEISMIC WAVES

(71) Applicant: Saudi Arabian Oil Company, Dhahran (SA)

(72) Inventor: Abdulrahman Alshuhail, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 799 days.

(21) Appl. No.: 16/526,458

(22) Filed: Jul. 30, 2019

(65) Prior Publication Data

US 2021/0031890 A1 Feb. 4, 2021

(51) Int. Cl.
*B63G 8/00* (2006.01)
*B63G 8/08* (2006.01)
*G01V 1/38* (2006.01)

(52) U.S. Cl.
CPC ............... *B63G 8/001* (2013.01); *B63G 8/08* (2013.01); *G01V 1/3808* (2013.01); *G01V 1/3852* (2013.01); *B63G 2008/004* (2013.01); *G01V 2210/1427* (2013.01)

(58) Field of Classification Search
CPC .... B63G 8/001; B63G 8/08; B63G 2008/004; G01V 1/3808; G01V 1/3852; G01V 1/02; G01V 1/04; G01V 1/09; G01V 1/047; G01V 2210/1427; G01V 2210/121; G01V 2210/1297
See application file for complete search history.

(56) References Cited

U.S. PATENT DOCUMENTS

| | | | |
|---|---|---|---|
| 4,051,918 A | 10/1977 | Rogers | |
| 5,360,951 A * | 11/1994 | Turpening | G01V 1/143 |
| | | | 367/189 |
| 5,442,590 A | 8/1995 | Svenning et al. | |
| 6,230,840 B1 | 5/2001 | Ambs | |

(Continued)

FOREIGN PATENT DOCUMENTS

| WO | WO 2003005062 | 1/2003 | |
|---|---|---|---|
| WO | WO-2010/136142 A2 * | 12/2010 | ........... G01V 1/3817 |

(Continued)

OTHER PUBLICATIONS pgs.com, [online], "Marine Vibrators Get Closer to Reality," retrieved from URL <https://www.pgs.com/publications/feature-stories/marine-vibrators/>, retrieved on Jul. 17, 2019, published on Dec. 13, 2017, 8 pages.

(Continued)

*Primary Examiner* — Ian J Lobo
(74) *Attorney, Agent, or Firm* — Fish & Richardson P.C.

(57) ABSTRACT

An autonomous underwater seismic wave generation system includes a housing, and an autonomous navigation system, a propulsion system and a seismic wave generator, each connected to the housing. The autonomous navigation system can navigate the autonomous underwater seismic wave generation system to subsea locations including a location on a seabed. The propulsion system can drive the autonomous underwater seismic wave generation system to the location on the seabed. The seismic wave generator can couple to the location on the seabed to generate seismic waves at the location on the seabed.

10 Claims, 3 Drawing Sheets

(56) References Cited

U.S. PATENT DOCUMENTS

| | | | |
|---|---|---|---|
| 8,717,844 B2 | 5/2014 | Welker et al. | |
| 9,090,319 B2 | 7/2015 | Brizard | |
| 9,140,814 B2 * | 9/2015 | Welker | G01V 1/3843 |
| 9,457,879 B2 | 10/2016 | Brizard | |
| 9,733,378 B2 * | 8/2017 | Carcaterra | G01V 1/3843 |
| 9,821,894 B2 | 11/2017 | Brizard et al. | |
| 9,821,895 B2 | 11/2017 | Brizard | |
| 9,873,494 B2 * | 1/2018 | Jewell | B63G 8/14 |
| 10,048,397 B2 | 8/2018 | Fyffe et al. | |
| 2012/0113756 A1 * | 5/2012 | Carcaterra | G01V 1/3843 |
| | | | 367/142 |
| 2014/0290554 A1 | 10/2014 | Brizard | |
| 2017/0219726 A1 * | 8/2017 | Jurok | E02D 3/12 |
| 2019/0317236 A1 * | 10/2019 | Lyssy | G01V 1/3835 |

FOREIGN PATENT DOCUMENTS

| | | |
|---|---|---|
| WO | WO 2012110096 | 8/2012 |
| WO | 2014095854 | 6/2014 |

OTHER PUBLICATIONS

PCT International Search Report and Written Opinion in International Appln. No. PCT/US2020/043984, dated Nov. 2, 2020, 16 pages.

* cited by examiner

AUTONOMOUS UNDERWATER VEHICLE TO GENERATE SEISMIC WAVES

TECHNICAL FIELD

This disclosure relates to generating seismic waves underwater.

BACKGROUND

Hydrocarbons can be entrapped in geological formations, which can sometimes be under water bodies, for example, oceans, seas. Information about the geological formations can help with extracting the entrapped hydrocarbons. One technique to obtain such information is using seismic waves. For example, a seismic wave (for example, an acoustic signal) is transmitted through the underwater geological formations and reflections of the seismic wave are received. The transmitted seismic wave and the reflections of the same can be used to obtain information about the geological formations which can then be used to extract the entrapped hydrocarbons.

SUMMARY

This disclosure describes technologies relating to an autonomous underwater vehicle to generate seismic waves.

Certain aspects of the subject matter described here can be implemented as an autonomous underwater seismic wave generation system. The system includes a housing, and an autonomous navigation system, a propulsion system and a seismic wave generator, each connected to the housing. The autonomous navigation system can navigate the autonomous underwater seismic wave generation system to subsea locations including a location on a seabed. The propulsion system can drive the autonomous underwater seismic wave generation system to the location on the seabed. The seismic wave generator can couple to the location on the seabed to generate seismic waves at the location on the seabed.

An aspect combinable with any other aspect can include the following features. An anchor is connected to the housing. The anchor can attach the autonomous underwater seismic wave generation system to the location on the seabed.

An aspect combinable with any other aspect can include the following features. The anchor includes a screw having an end configured to penetrate the seabed at the location on the seabed.

An aspect combinable with any other aspect can include the following features. The housing has a longitudinal length. The screw has a longitudinal length that is substantially one-third of the longitudinal length of the housing.

An aspect combinable with any other aspect can include the following features. The anchor is retractable into the housing.

An aspect combinable with any other aspect can include the following features, The anchor is connected to the seismic wave generator. The anchor is configured to transmit the seismic waves generated by the seismic wave generator to the location on the seabed.

An aspect combinable with any other aspect can include the following features. The autonomous underwater seismic wave generation system includes one or more rods connecting the anchor to the seismic wave generator. The one or more rods are configured to transmit the seismic waves generated by the seismic wave generator to the anchor.

An aspect combinable with any other aspect can include the following features. A motor is connected to the screw. The motor can rotate the screw to penetrate the location on the seabed.

An aspect combinable with any other aspect can include the following features. The anchor can detach from the housing after the seismic waves have been generated.

An aspect combinable with any other aspect can include the following features. The seismic wave generator can vibrate to generate the seismic waves.

An aspect combinable with any other aspect can include the following features. The seismic wave generator includes a hydraulic vibration system or an electromagnetic vibration system.

An aspect combinable with any other aspect can include the following features, The location on the seabed is a first location. The autonomous navigation system can perform operations that include storing multiple locations on the seabed including the first location, and, after the autonomous underwater seismic wave generation system generates the seismic waves at the first location, navigating to a second location of the multiple locations.

Certain aspects of the subject matter described here can be implemented as an autonomous underwater seismic wave generation system. An autonomous underwater seismic wave generation system autonomously navigates to a location on a seabed. The system anchors to the location on the seabed. At the anchored location, the system generates seismic waves.

An aspect combinable with any other aspect can include the following features. The system includes a seismic wave generator. To generate the seismic waves at the anchored location, the seismic wave generator vibrates.

An aspect combinable with any other aspect can include the following features. The system includes a screw. To anchor to the location on the seabed, the system penetrates the screw into the seabed at the location.

An aspect combinable with any other aspect can include the following features. The system includes a propulsion system. To penetrate the screw into the seabed, the propulsion system drives the system into the seabed at the location.

An aspect combinable with any other aspect can include the following features. The screw is oriented to be substantially perpendicular to the seabed prior to penetrating the screw into the seabed at the location.

An aspect combinable with any other aspect can include the following features. After generating the seismic waves at the location, the system detaches from the location.

An aspect combinable with any other aspect can include the following features. The location on the seabed is a first location. After detaching from the first location, the system autonomously navigates to a second location on the seabed, anchors to the second location and generates seismic waves at the second location.

An aspect combinable with any other aspect can include the following features. The system includes an autonomous navigation system. The navigation system stores the first location and the second location. The navigation system autonomously navigates the system to the second location based on the stored second location.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes an autonomous underwater vehicle (AUV) which can operate as an autonomous seismic source to autonomously travel to the seabed, couple itself to the seabed, then vibrate to generate a seismic wave, for example, in a predefined sweep. Subsequently, the AUV can decouple itself from the seabed and navigate autonomously to a next location on the seabed, where the AUV can once again perform these operations. In this manner, after being deployed from a base, the AUV can generate seismic waves, for example, acoustic waves, in one or more locations on the seabed and subsequently return to the base. The AUV described here can be implemented in marine seismic acquisition operations. As described later, the AUV penetrates the seabed prior to generating the seismic waves. Through autonomous navigation, the AUV ensures that seismic waves are generated at the desired location on the seabed. Such implementation is an improvement over implementations in which the seismic source is towed over an approximate, subsea location. By implementing a predefined sweep, the AUV can generate seismic waves at known frequencies or frequency bands. Moreover, generating waves above the seabed has a better chance at ensuring that the seismic waves are not dissipated through absorption while traveling through the water column. Having a vibratory system also makes it easier and more accurate in obtaining a source wavelet which is needed for processing the seismic data.

Figure 1:
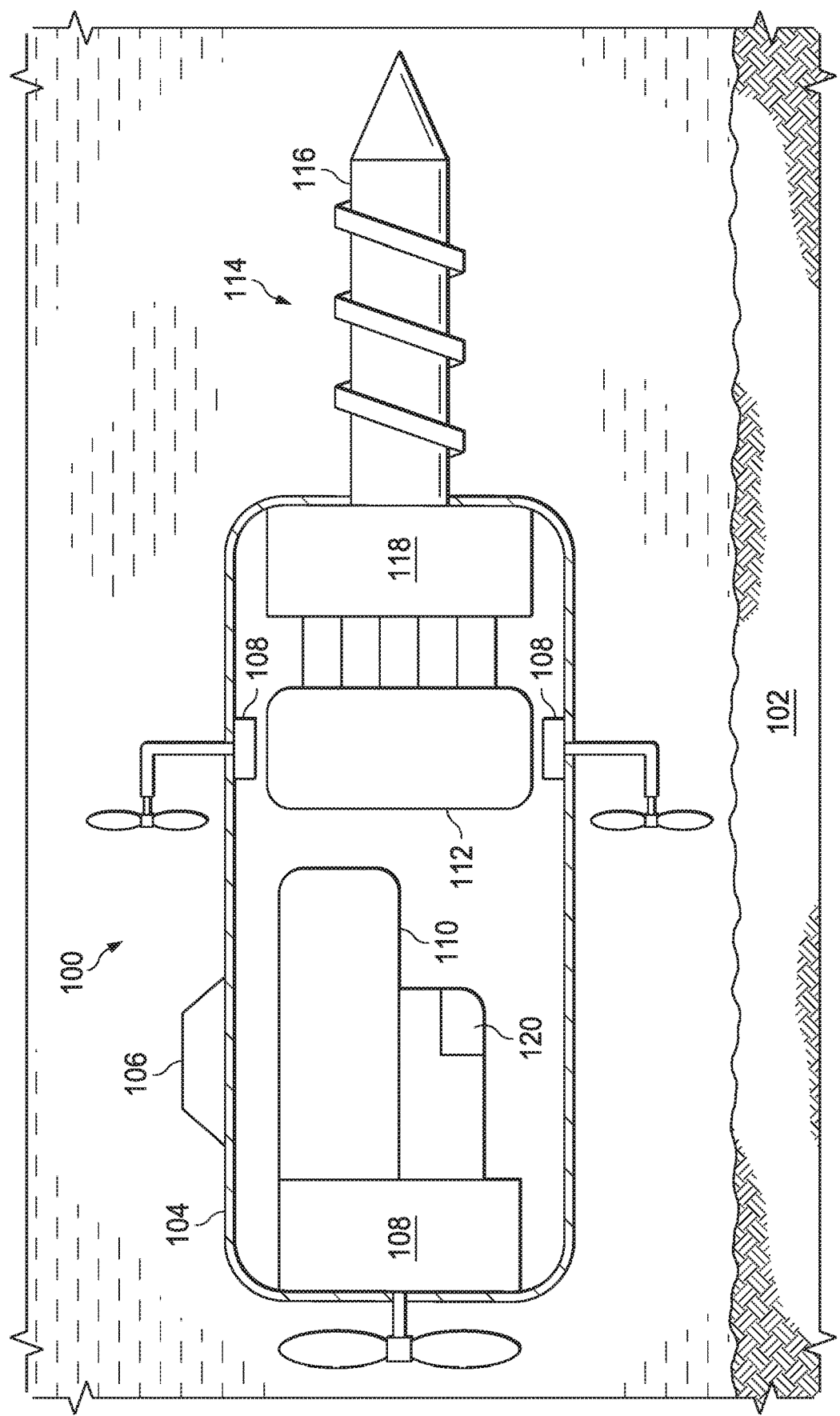
FIG. 1 is a schematic diagram of an example of an autonomous underwater seismic wave generation system.

FIG. 1 is a schematic diagram of an example of an autonomous underwater seismic wave generation system 100. The seismic wave generation system 100 can be deployed in under water bodies (for example, oceans, seas, or similar under water bodies) below which geological formations reside. For example, such geological formations can carry entrapped hydrocarbons in hydrocarbon reservoirs. As described in this disclosure, the seismic wave generation system 100 can couple to the seabed 104 and generate seismic waves that can be used to obtain information about the geological formations.

Example components of the seismic wave generation system 100 are described with reference to FIG. 1. All components are designed to survive and operate efficiently in under water conditions, for example, at the temperatures and pressures and in the presence of the water. To this end, the material using which each component is manufactured can be selected or processed (or both) to operate in such conditions. In some implementations, the seismic wave generation system 100 includes a housing 104 to which the different components of the seismic wave generation system 100 can be connected. Also, the housing 104 can have a hydrodynamic design (for example, like a torpedo) to allow the seismic wave generation system 100 to efficiently travel under water.

The seismic wave generation system 100 can include an autonomous navigation system 106 connected to the housing 104. The autonomous navigation system 106 can navigate the seismic wave generation system 100 to subsea locations, for example, locations on the seabed 102. For example, the autonomous navigation system 106 can include a controller (for example, one or more computer processors) and a computer-readable storage medium. The medium can store a detailed map of the underwater region in which the seismic wave generation system 100 is to be deployed. The autonomous navigation system 106 can include an underwater acoustic positioning system. Alternatively or in addition, the autonomous navigation system 106 can also include global positioning system (GPS), global navigation satellite system (GLASS), or ultra-short baseline (USBL) using which the autonomous navigation system 106 can self-locate as well as identify new locations in the underwater region. Using the underwater acoustic positioning system or the GPS/GNSS system, the controller can execute computer instructions, also stored on the medium, to determine directions from a current location to a new location in the underwater region.

The seismic wave generation system 100 includes a propulsion system 108 connected to the housing 104. The propulsion system 108 can drive the seismic wave generation system 100 to each of one or more locations on the seabed 102. The propulsion system 108 can include the engine, rudders, propellers and other driving and guidance features to drive the seismic wave generation system 100 under water. The propulsion system 108 can control a pitch, a yaw and a roll of the seismic wave generation system 100 under water. The propulsion system 108 can also cause the seismic wave generation system 100 to travel in any direction under water (for example, forwards backwards, upwards, downwards, leftwards, rightwards).

The propulsion system 108 and the autonomous navigation system 106 can be operatively coupled. By doing so, the autonomous navigation system 106 can communicate the direction from a first location (for example, the current location of the seismic wave generation system 100) to a new location (for example, a desired location on the seabed 102) to the propulsion system 108. The propulsion system 108 can navigate the seismic wave generation system 100 to the new location. The propulsion system 108 can include a power supply 110, for example, a battery or a re-chargeable battery, to power all components of the seismic wave generation system 100. In some implementations, the seismic wave generation system 100, in particular, the controller of the autonomous navigation system 106 can monitor a quantity of power remaining in the power supply 110 and a quantity of power required for the seismic wave generation system 100 to return to the base from which the seismic wave generation system 100 was deployed. In response to determining that the quantity of power remaining is within a threshold power level of the quantity of power required to return to the base, the seismic wave generation system 100 can override all other instructions and autonomously navigate back to the base.

The seismic wave generation system 100 includes a seismic wave generator 112. connected to the housing 104. The seismic wave generator 112 can couple to the location on the seabed 102 and generate seismic waves at the location on the seabed 102. The generated seismic waves travel through the geological formation around the location at which the waves were generated. Seismic receivers (not shown) can receive reflections of the generated seismic waves. In some implementations, the seismic wave generator 112 can vibrate to generate the seismic waves. For example, the seismic wave generator 112 can include a hydraulic vibration system or an electromagnetic vibration system. The electromagnetic vibration system uses powerful magnets that bend spring elements, which displaces water to create the acoustic waves. In some implementations, the seismic wave generator 112 is a marine vibrator or an underwater acoustic projector. In some implementations, the seismic wave generator 112 can vibrate in a linear sweep at a frequency range between 2 Hertz (Hz) and 120 Hz, Seismic waves generated at these frequencies are better suited for geological studies compared to waves generated at other frequencies. For example, waves generated at these frequencies can image different layers in the subsurface at sufficient depth.

In some implementations, the seismic wave generator 112 can include a clock 120 (for example, an atomic clock). The clock 120 can associate time to the generated seismic waves. For example, the clock 120 can run a timer for a duration for which the seismic wave generator 112 generates the seismic waves. To each seismic wave generated at a time instant, the controller can associate a timestamp using the timer run by the clock 120. In some implementations, whenever the seismic wave generator 112 vibrates, the clock 120 records the time instant which the seismic wave generator 112 started. This timestamp is then used in extracting the recorded data from the receivers (not shown). In this manner, the controller can generate a temporal frequency profile of the generated seismic waves.

The seismic wave generation system 100 includes an anchor 114 connected to the housing 102. The anchor 114 can attach the seismic wave generation system 100 to location on the seabed 102. Once anchored, the seismic wave generation system 100 can activate the seismic wave generator 112 to generate the seismic waves. In some implementations, the anchor 114 includes a screw 116 (or a drill) having a first end attached to the housing 104 and a second, free end, that can penetrate into the seabed 102. When fully extended outside the housing 104, the longitudinal length of the anchor 114 can be about one-third the longitudinal length of the housing 104. By "about one-third," it is meant that the length of the anchor 114 can range between one-fourth to one-half of the length of the housing 104.

The seismic wave generation system 100 includes a rotary drive 118 connected to the anchor 114. The rotary drive 118 can include, for example, a motor or other components that can apply rotational force to the anchor 114. In some implementations, the rotary drive 118 can be connected to the controller. After the seismic wave generation system 100 has been positioned at a determined location on the seabed 104, the controller can transmit an instruction to the rotary drive 118 to rotate the anchor 114. As the anchor 114, the controller can transmit an instruction to the propulsion system 108 to move the seismic wave generation system 100 toward the seabed 102 such that the anchor 114 penetrates the seabed 102. In some implementations, a proximity sensor (not shown) is attached to the body 104 on a surface at which the anchor 114 connects to the body 104. As the anchor 114 penetrates the seabed 102, the proximity sensor detects a distance between the body 104 and the seabed 102. When the distance satisfies a threshold distance, the proximity sensor transmits a signal to the controller. In response, the controller transmits an instruction to the propulsion system 108 to cease moving the seismic wave generation system 100 toward the seabed and an instruction to the rotary drive 118 to cease rotating the anchor 114. In some implementations, the threshold distance can map to about 90% of the length of the anchor 114. In this manner, the seismic wave generation system 100 self-anchors to a location in the seabed 102. After the seismic wave generator 112 generates the acoustic waves, the controller can transmit an instruction to the rotary drive 118 to rotate in the opposite direction and an instruction to the propulsion system 118 to move the seismic wave generation system 100 in a direction away from the seabed 102. In this manner, the seismic wave generation system 100 uncouples or de-anchors from the seabed 102 and can autonomously navigate to the next location, which can be another location in the seabed 102 or the base from which the seismic wave generation system 100 was deployed.

In some implementations, the anchor 114 remains extended outside the housing 104 at all times. In some implementations, the anchor 114, specifically, the screw 116, is retractable within the housing 104. For example, the anchor 114 can be retracted using pistons or a motor that extends rods to extend or retract the anchor 114, specifically, the screw 116. In such implementations, the housing 102 can include an opening that can be closed with a seal (for example, a valve or a flap). The seal can be open when the anchor 114 is extended outside the housing 104. The seal can be closed, for example, responsive to an instruction from the controller, after the anchor 114 is retracted into the housing 104.

In some implementations, the seismic wave generator 112 is directly connected to the anchor 114. In such implementations, the vibrations of the seismic wave generator 112 are transmitted directly to the anchor 114 and from the anchor 114 to the seabed 102. In some implementations, the seismic wave generator 112 is indirectly connected to the anchor 114, for example, through rods (not shown). In such implementations, the vibrations of the seismic wave generator 112 are transmitted, first to the rods, from the rods to the anchor 114 and from the anchor 114 to the seabed 102. To this end, the anchor 114 and, when implemented, the rods, are made from a material that can conduct acoustic waves with little to no attenuation.

As described earlier, the controller can be implemented to control multiple (sometimes all) operations performed by the seismic wave generation system 100. To this end, the seismic wave generation system 100 can include multiple sensors (not shown), for example, attached to the housing 104 and connected to the controller, to sense various parameters and transmit the sensed parameters to the controller. The controller can execute autonomous navigation, autonomous propulsion and autonomous anchoring and de-anchoring operations based on the sensed parameters.

Figure 2:
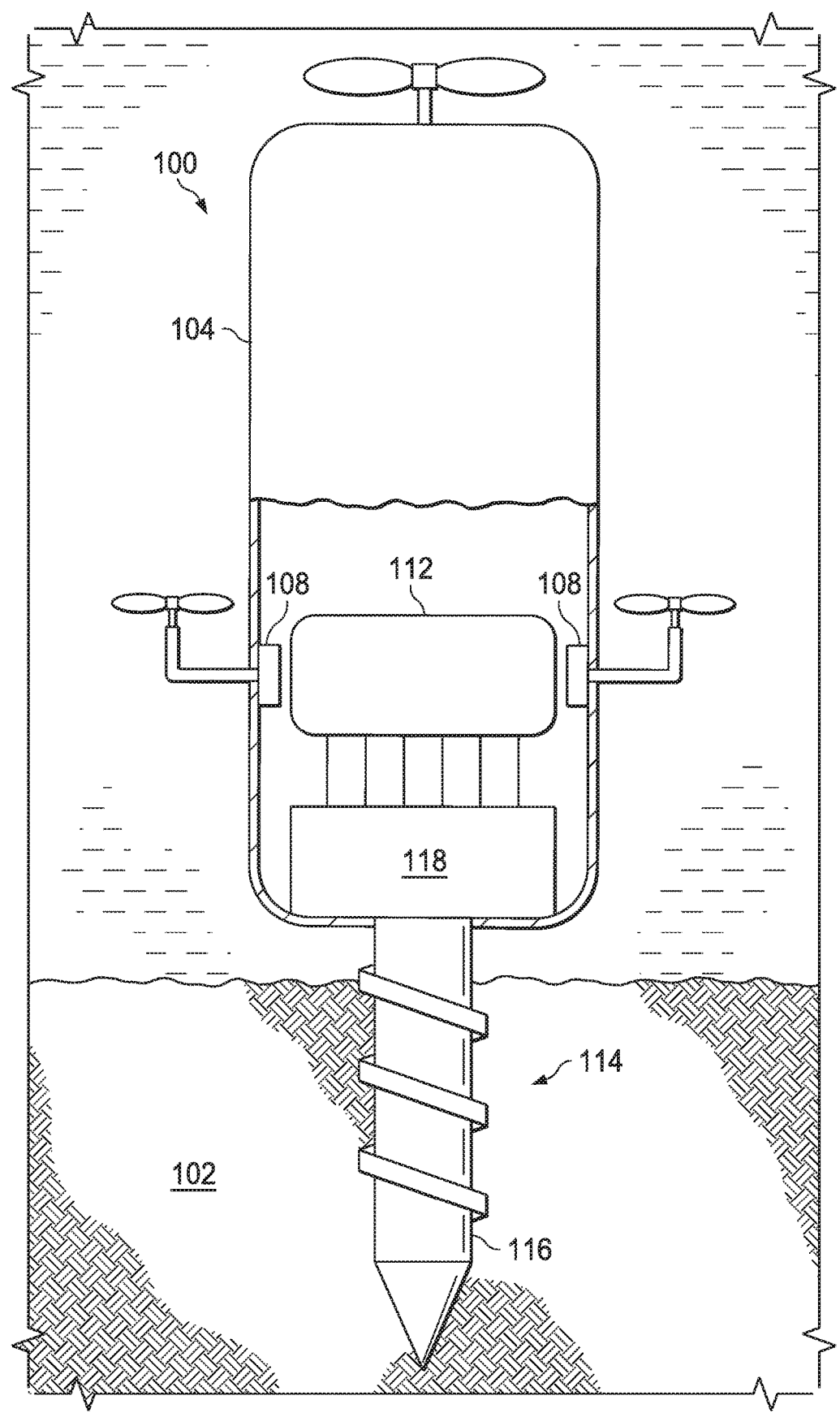
FIG. 2 is a schematic diagram of the seismic wave generation system of FIG. 1 coupled to the seabed.

FIG. 2 is a schematic diagram of the seismic wave generation system 100 of FIG. 1 coupled to the seabed 102. In operation, the seismic wave generation system 100 is deployed from a base (not shown), for example, a location on a marine vessel. The navigation system 106 stores multiple locations on the seabed 102. By controlling the propulsion system 108 and the navigation system 106, the controller autonomously navigates the seismic wave generation system 100 to a first location on the seabed 102. At the first location, the controller causes the propulsion system 108 to orient the seismic wave generation system 100 relative to the seabed 102 to facilitate penetration of the anchor 114 into the seabed 102. For example, the controller causes the propulsion system 108 to orient the anchor 114 to be substantially perpendicular to the seabed 102. By "substantially perpendicular," it is meant that an angle between the longitudinal axis of the anchor 114 and the horizontal plane of the seabed 102 can range between 80° to 100°. Other orientations are possible. For example, the angle between the anchor 114 and the horizontal plane of the seabed 102 can range between 30° to 75° or between 105° to 150°.

After orienting the seismic wave generation system 100, the controller causes the rotary drive 118 to rotate the anchor 114 and the propulsion system 108 to drive the seismic wave generation system 100 toward the seabed 102. In some implementations, once the free end of the anchor 114 contacts the seabed 102, the controller can stop the propulsion system 108 from driving the seismic wave generation system 100 toward the seabed 102. The rotary action of the anchor 114 can penetrate the seabed 102 and draw the seismic wave generation system 100 toward the seabed 102. In such implementations, the power used by the power supply 110 can be decreased. Alternatively, the controller can cause the propulsion system 108 to continue to drive the seismic wave generation system 100 toward the seabed 102 after the free end of the anchor 114 contacts the seabed 102. In such implementations, the seismic wave generation system 100 penetrates the seabed 102 faster compared to the previous implementation.

After the anchor 114 has penetrated the seabed 102 to a sufficient depth, the controller turns off the rotary drive 118 and turns on the seismic wave generator 112. The seismic wave generator 112 generates vibrations which are transmitted through the anchor 114 (either directly or indirectly) to the seabed 102. The vibrations cause seismic waves in the water surrounding the location of the seabed 102 in which the seismic wave generation system 100 is anchored. In some instances, transmitting the vibration through the anchor 114 can cause the anchor 114 to be dislodged from the seabed 102. Nevertheless, the vibration transmitted through the anchor 114 can generate seismic waves in the water, if not in the seabed 102. After the seismic wave generator 112 has generated the vibrations for a duration, the controller can turn off the seismic wave generator 112.

Then, the controller can turn on the rotary drive 118 (and, if needed, the propulsion system 106) to dislodge the seismic wave generation system 100 from the seabed. To do so, the controller can cause the rotary drive 118 to rotate the anchor 114 in the opposite direction or cause the propulsion system 108 to drive the seismic wave generation system 100 away from the seabed 102 until the anchor 114 is dislodged from the seabed 102. Subsequently, the controller can identify the next location, which can be another location in the seabed 102. The controller can cause the navigation system 106 and the propulsion system 108 to navigate the seismic wave generation system 100 to the next location and repeat the seismic wave generation operations described here. In this manner, the controller can cause the seismic wave generation system 100 to generate seismic waves in multiple locations on the seabed. After generating seismic waves at the multiple locations or in response to determining insufficient power levels to complete the seismic wave generation operations at all the locations, the controller can cause the seismic wave generation system 100 to return to the base.

Figure 3:
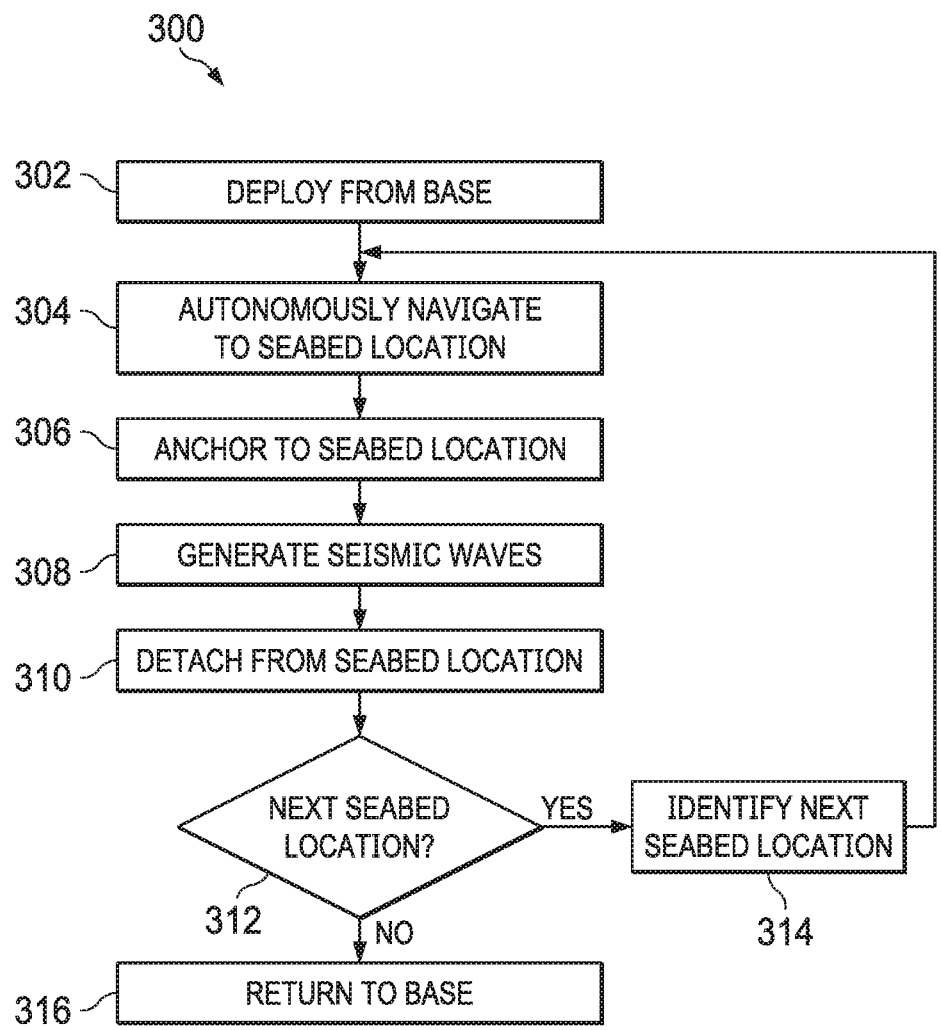
FIG. 3 is a flowchart of an example of a process for generating seismic waves using the seismic wave generation system of FIG. 1.

FIG. 3 is a flowchart of an example of a process 300 for generating seismic waves using the seismic wave generation system of FIG. 1. The process 300 can be implemented, for example, by the controller described with reference to FIGS. 1 and 2. At 302, the seismic wave generation system 100 is deployed from a base. At 304, the seismic wave generation system 100 is autonomously navigated to a seabed location. At 306, the seismic wave generation system 100 is anchored to the seabed location. At 308, the seismic wave generation system 100 is operated to generate seismic waves. At 310, the seismic wave generation system 100 is detached from the seabed location. At 312, a check is made to determine if a next seabed location is available. If a next seabed location is available, (decision branch "YES"), then, at 314, the next location is identified and the process steps 304, 306, 308, 310 and 312 are repeated. If the next seabed location is not available, (decision branch "NO"), then, at 316, the seismic wave generation system 100 returns to the base.

The disclosure describes operations implemented with reference to one seismic wave generation system. In some implementations, seismic wave generation can be implemented using a fleet of seismic wave generation systems, each being similar to the seismic wave generation system 100. In such implementations, multiple seismic wave generation systems can be simultaneously deployed from the same base to different locations on the seabed 102. Each seismic wave generation system can include a respective, dedicated controller that can perform operations described earlier to generate seismic waves at one or more locations on the seabed. Alternatively, all the seismic wave generation systems can be coupled to a master controller, which can reside at the base, to control each seismic wave generation system to perform the operations described earlier. In a further implementation, each seismic wave generation system can include a respective, dedicated controller in communication with the master controller to coordinate the seismic wave generation operations.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. An autonomous underwater seismic wave generation system comprising:
   a housing;
   an autonomous navigation system connected to the housing, the autonomous navigation system configured to navigate the autonomous underwater seismic wave generation system to subsea locations comprising a location on a seabed;
   a propulsion system connected to the housing, the propulsion system configured to drive the autonomous underwater seismic wave generation system to the location on the seabed;
   a seismic wave generator connected to the housing, the seismic wave generator configured to couple to the location on the seabed and to generate seismic waves at the location on the seabed; and
   an anchor connected to the housing, the anchor configured to attach the autonomous underwater seismic wave generation system to the location on the seabed, wherein the anchor is retractable into the housing.

2. The autonomous underwater seismic wave generation system of claim 1, wherein the anchor comprises a screw comprising an end configured to penetrate the seabed at the location on the seabed.

3. The autonomous underwater seismic wave generation system of claim 2, wherein the housing has a longitudinal length, wherein the screw has a longitudinal length that is substantially one-third of the longitudinal length of the housing.

4. The autonomous underwater seismic wave generation system of claim 1, wherein the anchor is connected to the seismic wave generator, wherein the anchor is configured to transmit the seismic waves generated by the seismic wave generator to the location on the seabed.

5. The autonomous underwater seismic wave generation system of claim 4, further comprising one or more rods connecting the anchor to the seismic wave generator, wherein the one or more rods are configured to transmit the seismic waves generated by the seismic wave generator to the anchor.

6. The autonomous underwater seismic wave generation system of claim 2, further comprising a motor connected to the screw, the motor configured to rotate the screw to penetrate the location on the seabed.

7. The autonomous underwater seismic wave generation system of claim 1, wherein the anchor is configured to detach from the housing after the seismic waves have been generated.

8. The autonomous underwater seismic wave generation system of claim 1, wherein the seismic wave generator is configured to vibrate to generate the seismic waves.

9. The autonomous underwater seismic wave generation system of claim 8, wherein the seismic wave generator comprises a hydraulic vibration system or an electromagnetic vibration system.

10. The autonomous underwater seismic wave generation system of claim 1, wherein the location on the seabed is a first location, wherein the autonomous navigation system is configured to perform operations comprising:
    storing a plurality of locations on the seabed including the first location; and
    after the autonomous underwater seismic wave generation system generates the seismic waves at the first location, navigating to a second location of the plurality of locations.

\* \* \* \* \*